United States Patent [19]

Wiemann et al.

[11] Patent Number: 4,573,899

[45] Date of Patent: Mar. 4, 1986

[54] PLANT FOR THE MANUFACTURE OF PARTICLEBOARD

[75] Inventors: Dieter Wiemann, Barsinghausen; Günther Bodusch, Springe, both of Fed. Rep. of Germany

[73] Assignee: Bison-Werke Bahre & Greten GmbH & Co. KG, Springe, Fed. Rep. of Germany

[21] Appl. No.: 563,373

[22] Filed: Dec. 20, 1983

[30] Foreign Application Priority Data

Dec. 22, 1982 [DE] Fed. Rep. of Germany ....... 3247551

[51] Int. Cl.⁴ ....................... B29C 43/02; B29C 43/34; B29C 45/77

[52] U.S. Cl. .................................. 425/145; 425/80.1; 425/150; 425/297

[58] Field of Search ............... 425/404, 453, 296, 297, 425/253, 256, 452, DIG. 118, DIG. 201, 80.1, 81.1, 145, 150, 83.1; 264/109, 118, 119; 100/194, 196, 215; 198/577, 579

[56] References Cited

U.S. PATENT DOCUMENTS

| | | | |
|---|---|---|---|
| Re. 30,759 | 10/1981 | Burkner | 100/196 |
| 2,263,207 | 11/1941 | Coumbe et al. | 264/118 |
| 2,697,254 | 12/1954 | Gordon | 264/115 |
| 2,923,030 | 2/1960 | Himmelheber | 425/81.1 |
| 2,989,774 | 6/1961 | Erickson et al. | 264/118 |
| 3,173,976 | 3/1965 | Paerels et al. | 425/80.1 |
| 3,332,819 | 7/1967 | Siempelkamp | 198/577 |
| 3,428,505 | 2/1969 | Siempelkamp | 100/215 |
| 3,485,339 | 12/1969 | Miller et al. | 198/577 |
| 3,565,725 | 2/1971 | Siempelkamp | 100/215 |
| 3,860,381 | 1/1975 | Pesch | 100/194 |
| 4,321,028 | 3/1982 | Van de Caveye | 425/256 |
| 4,372,899 | 2/1983 | Wiemann et al. | 425/80.1 |

*Primary Examiner*—Willard E. Hoag

[57] ABSTRACT

A plant for the manufacture of chipboard, fibreboard or similar boards is described wherein mat sections coming from a stationary scattering section are supplied via an intermediate conveyor to a cyclically operating press with a loading and unloading device, and wherein an arrangement is provided for returning mat carriers separated at the press outlet from the compressed mat sections. The mat sections are supplied to the intermediate conveyor from a forming band via a transfer table which variably overlaps the intermediate conveyor. This intermediate conveyor simultaneously serves as a supply unit for the mat carriers which are provided with laterally engageable head strips. The loading and unloading device of the press includes transport devices which extend on both sides of the press and cooperate with the head strips of the mat carriers. The transport devices extend, over a part of their length, parallel to and alongside the corresponding transport devices of the intermediate conveyor. A mat carrier transfer station between the transport devices of the loading and unloading device and the transport devices of the intermediate conveyor is provided beneath the conveying plane for the mat sections.

15 Claims, 3 Drawing Figures

PLANT FOR THE MANUFACTURE OF PARTICLEBOARD

Figure 1:
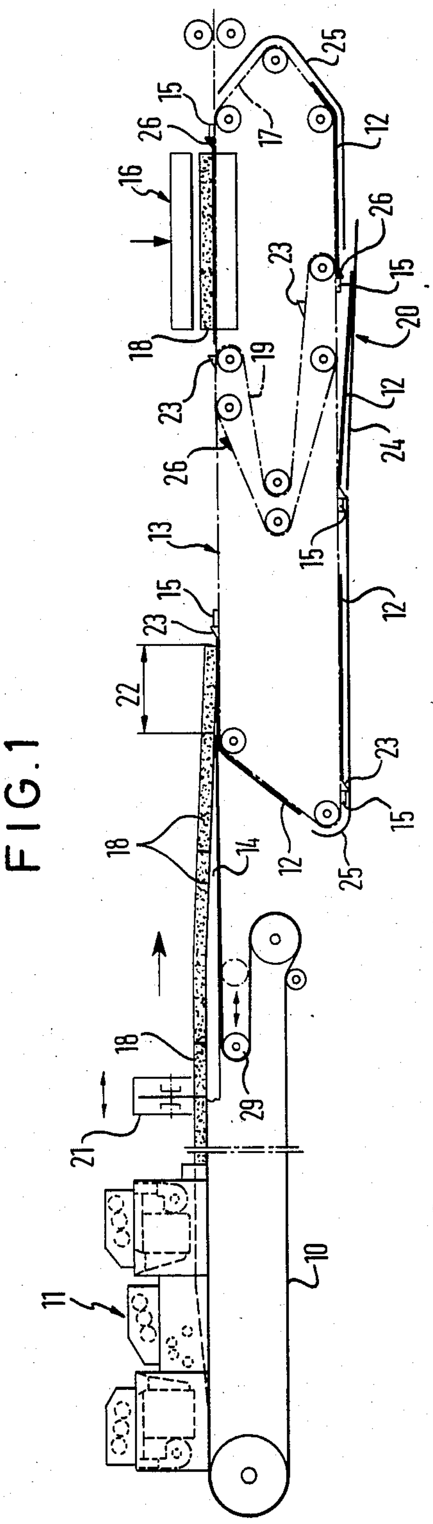

The invention relates to a plant for the manufacture of particleboard, such as chipboard, fibreboard or other similar boards.

In some known plants of this kind the plant comprises a stationary scattering station for scattering a mat of particular material, a continuously driven endless forming band on which the mat is scattered and which is moved beneath the scattering station and a movable mat cutting saw for dividing the mat into individual mat sections. The forming band is followed by an intermediate conveyor and a cyclically operating press, there being loading and unloading means for the press and means for returning mat carriers separated from the compressed mat sections at the output of the press.

In known plants of this kind difficulties arise in simultaneously satisfying the requirements of transporting the mat sections so that they are not damaged, of ensuring short cycle times, and of providing an overall construction of the plant which is as simple as possible.

The principal object underlying the invention is thus to further develop a plant of the initially named kind so that one achieves a construction of short overall length, so that one achieves short cycle times which are at least substantially determined only by the press, so that one ensures transport of the mat sections in such a way that they are not susceptible to damage, and so that one avoids mutual influences between the transport and loaded mat carriers and the transport of the empty mat carriers, which takes place without intermediate storage.

This object is satisfied by the invention by the improvement wherein the forming band is guided at its turn around point remote from the forming station over a transfer table which is movable substantially in a horizontal plane and which variably overlaps the adjacent intermediate conveyor; wherein the intermediate conveyor is simultaneously constructed as a supply unit for the mat carriers, which are each provided with a laterally engageable head strip; wherein the loading and unloading means for the press comprise transport devices which extent on either side of the press and cooperate with the head strips of the mat carriers, and which extend over a part of their length parallel to and alongside corresponding transport devices of the intermediate conveyor; and wherein a mat carrier transfer station between the transport devices of the loading and unloading means and the transport devices of the intermediate conveyor is provided beneath the plane of conveyance of the mat sections.

The cooperation of a transfer table (known per se), which is movable in a horizontal plane, with conveyors which are overlapped in the region where the press is loaded and in the region where the mat carriers are returned results, amongst other advantages, in a construction of surprisingly short overall length. Furthermore, the complexity of the controls required for the cooperation of the individual components is minimised. In addition this construction results in extremely careful transport of the mat sections, the length of which can be freely chosen within predetermined limits. At the same time structural dislocations in the mat sections are prevented, because only a single transfer position is present between the forming station of the press.

In the transfer station for the unloaded mat carriers there is preferably provided a waiting table inclined relative to a horizontal plane, with the inclined position of the waiting table being selected so that the engagement devices of the transport devices associated with the loading and unloading means for the press move out of engagement with the head strips of the head carriers, and so that the engagement of the transport devices of the intermediate conveyor enter into engagement with the head strips of the mat carriers. This transfer station, which is of extremely simple design, combines high operational reliability with the lowest possible space requirements.

The transport devices of the intermediate conveyor and of the loading and unloading means for the press advantageously consist of chain conveyors equipped with engagement means for engaging with the head strips of the mat carriers, i.e. of simple, operationally reliable, units which are completely uncritical so far as servicing is concerned.

Having regard to the desired minimisation of the control complexity required for the overall plant it is of particular significance that, in accordance with a further special feature of the invention, the drive for the movement of the transfer table on the one hand and the drive for the forming band and the intermediate conveyor on the other hand are not synchronised with one another.

The intermediate conveyor is preferably constructed as an accelerating conveyor so that it is always possible to bring a mat section into the waiting position in front of the press, so that it is only the press cycle which decides the output of the plant. The waiting time of the mat section in front of the press simultaneously represents a buffer time which makes it possible to keep the forming band speed independent of the press cycle within appropriate practical limits.

A single cut saw can be used as the mat cutting saw because the mat sections are not arranged on mat carriers in the region where they are divided up. Accordingly no return movement of material is necessary in the mat dividing region. At least one high frequency heating device and/or a prepress is preferably arranged between the forming station and the transfer table, which has a turn-around point for the forming band which is shaped like a knife-edge. This is made possible by the absence of mat carriers in this region. In addition to the mentioned devices it is also possible to provide metal seeking and extraction devices, moistening devices and also control devices for the board quality in this region.

The end position of the transfer table after completion of its movement towards the press is, in accordance with a further particular aspect of the invention, adjustable in dependence on the position of the mat carrier located in the pick-up position and on the length of the actual mat section. In this arrangement the prevailing pressside end position of the transfer table is preferably controlled by an end switch arranged on the transfer table and actuated by the head strips of the mat carriers. The position of the end switch is advantageously steplessly variable.

The start of the intermediate conveyor and the return movement of the transfer table is controlled, in accordance with a further special aspect of the invention, in dependence on the arrival of the mat section at the knife edge of the transfer table, for which purpose at least one appropriate sensor or switch is provided.

In order to achieve a particularly careful transfer of the mat sections from the forming band onto the subsequent intermediate conveyor it is of advantage if, in accordance with a further development of the invention, the chassis for movement of the transfer table is so pivotally supported in the forming band guide that the knife-edge of the transfer table at least substantially contacts the respectively present mat carrier, wherein the head strips of the respective mat carriers lift and lower the transfer table as they overtake it.

A further special feature of the invention, which is favourable to the manner of operation and to the simple control of the plant, resides in the fact that the speed of movement of the transfer table is larger than the maximum forming band speed and smaller than the maximum speed of the intermediate conveyor.

Figure 2:
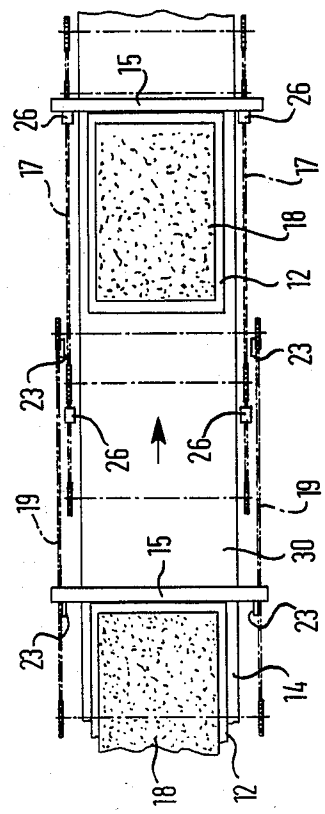
Figure 3:
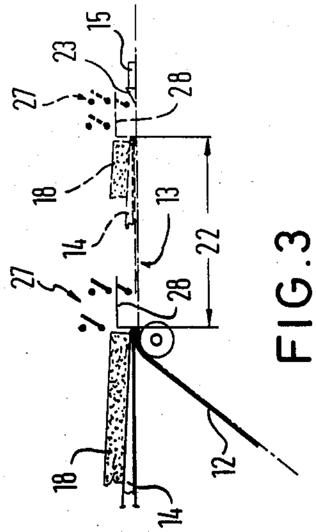

The invention will now be described in more detail with reference to the embodiment shown in the drawing in which:

FIG. 1 shows a schematic overall view of an embodiment of the plant of the invention, FIG. 2 shows a schematic partial plan view of the plant of FIG. 1, and FIG. 3 shows a schematic illustration for explaining the transfer of mat sections between the forming band and the intermediate conveyor.

As seen in FIG. 1 an endless forming band 10, which preferably comprises a textile band, is passed beneath a stationary forming station 11 and an endless mat is built up on this forming band 10 beneath the forming station 11.

A mat cutting saw 21, which is of movable construction, serves to divide the endless mat into individual mat sections 18, which are laid or transferred onto mat carriers 12 in the region of the transition from the forming band 10 to a subsequent intermediate conveyor 13.

The forming band 10 is guided, at its turn-around point remote from the forming station 11, over a transfer table 14, which can move in a substantially horizontal plane and has a turn-around point shaped like a knife edge. In view of the changing length of the upper run of the forming band, which results from the movement of the transfer table 14, at least one deflection roller 29 for the forming band 10 is displaceably journalled in accordance with the movement of the transfer table 14. The extent of movement of the transfer table 14 is designated by the reference numeral 22.

The intermediate conveyor 13 is simultaneously constructed as a supply unit for the mat carriers 12 which are each provided with a laterally engageable head strip 15. In the specific construction the intermediate conveyor 13 has conveyor chains 19 which extend on both sides of a support table 30 for the mat carriers 12. Engagement devices or followers 23 for the head strips 15 of the mat carriers 12 are attached to the conveyor chains 19.

The intermediate conveyor 13 extends up to the region in front of the press 16, is however overlapped in this region by a further chain conveyor 17 which forms the loading and unloading means for the press 16. The conveyor 17 is constructed in similar manner to the intermediate conveyor 13 and has engagement devices 26.

The conveyor chains 19 of the intermediate conveyor 13 are deflected downwardly in front of the press 16 so that the engagement between the engagement devices 23 and the head strips 15 is lost and so that the later, further transport of the mat carriers 12 bearing the mat sections 18 can take place by the chains 17 of the loading and unloading means, which are provided with the engagement devices 26.

At the output side of the press the mat carriers 12 are separated from the compressed mat sections and are guided by means of the chain conveyor 17 to a transfer station 20 disposed beneath the plane of conveyance of the mat sections. Sheet metal guides 25, which ensure engagement between the engagement devices 26, 23 and the head strips 15, are provided over the entire return path for the mat carriers 12.

A waiting table 24 which is inclined relative to the horizontal direction is provided in the transfer station 20 and the inclined position of this waiting table is selected so that the engagement devices 26 of the chain conveyor 17 of the loading and unloading means for the press move out of engagement with the head strips of the mat carriers, and so that the engagement devices 23 of the transport chains 19 of the intermediate conveyor 13 move into engagement with the head strips 15 of the mat carriers 12. In this manner an extremely simple and reliable return movement of the mat carriers is ensured without any requirements being placed on synchronisation.

The plan view of FIG. 2 shows the relative arrangements between the movable transfer table 14 and the intermediate conveyor formed by the transport chains 19 and their engagement devices 23 on the one hand, and between this intermediate conveyor and the loading and unloading means for the press on the other hand, the latter likewise being formed by two transport chains 17 and their engagement devices 26.

FIG. 3 shows the transfer table 14 in conjunction with the switch arrangement 27 provided on this transfer table A switch carrier 28 is schematically illustrated.

The band transfer table 14 is movable over the intermediate conveyor 13 in the region 22 and this arrangement of the transfer table above the intermediate conveyor contributes to a substantial reduction of the constructional length of the overall plant.

As the intermediate conveyor 13 can simultaneously fulfil the function of an accelerating conveyor, the desired spacing of the individual mat sections 18 is achieved without problem in conjunction with the movable table 14. Moreover, an adequate waiting time in front of the press 16 is achieved for each mat section to be pressed. In this way the effects of fluctuations of the press cycle time on the forming band speed can be compensated. Furthermore, additional complex control devices or reductions in output due to forming band speeds which are too low are avoided.

The movement of the transfer table 14 is not synchronised with the speed of the forming band 10 and is also not synchronised with the speed of the intermediate or accelerating conveyor 13. The actual end position of the transfer table 14 after completion of the movement in the direction of production towards the press is dependent on the position of the mat carrier 12 located in the pickup position. This end position can be steplessly changed by adjusting an end switch belonging to the switch arrangement 27. In this way the position of the respective mat section on the mat carrier 12 can be freely selected. By way of example, this has the consequence that the actual mat section can always be centrally positioned in the press, even on changing the length of the mat section.

In place of the mechanical switches schematically illustrated in FIG. 3, in particular the end switches, it is also possible to use light barrier arrangements and the like.

The chassis for the transfer table 14 is so constructed that the head strips 15 of the mat carriers 12, which as a result of their function are always thicker than the mat carriers themselves, automatically lift and lower the transfer table 14 on overtaking it. This ensures that during the transfer of a mat section the band directly contacts the mat carrier, which preferably has a sieve-like or meshed structure at the knife-like deflection point. This in turn ensures an almost air gap free transfer of the mat section onto the mat carrier.

The plant described above operates as follows:

At the start of operation the intermediate conveyor 13 and the conveyor 17 associated with the press 16 are equipped with mat carriers 12, it being important that only a very few mat carriers are required for the plant of the invention.

The transfer table 14 is located in the end position adjacent the press and the end switch secured to the transfer table contacts the waiting head strip 15.

The mat sections are moved up via the forming band 10.

As soon as the front edge of a mat carrier 18 reaches the knife edge of the transfer table 14 the intermediate conveyor 13 starts to move at the speed of the forming band. At the same time the transfer table 14 starts to move backwardly and moves at a fixedly selected speed into the rear end position. During this time the forming band does not change its preadjusted speed. When the rear edge of the mat section 18 reaches the knife edge of the transfer table 14, i.e. the mat section 18 has been completely deposited on the mat carrier 12, the intermediate conveyor 13 accelerates and positions the mat section 18 in front of the press. On acceleration the head strip 15 raises and lowers the transfer table 14 as it overtakes the knife edge. At the same time as acceleration takes place the transfer table once again moves forwardly and indeed until its end position relative to the mat carrier 12 is again reached.

The speed of movement of the transfer table 14 is larger during this than the maximum speed of the forming band and smaller than the maximum speed of the intermediate conveyor 13 which acts as the accelerating conveyor. The acceleration of the transfer table is smaller than the acceleration of the intermediate conveyor 13.

A precondition for the acceleration of the intermediate conveyor 13 is always that the conveyors 17 associated with the press have picked up the mat carrier 12 waiting in front of the press and draw it into the press. Through this, and through the guidance of the conveyor chains 19 of the intermediate conveyor 13, it is ensured that an empty mat carrier 12 is only picked up by the chain conveyors 19 in the transfer station 20 beneath the press 16 when the press is loaded, i.e. that the empty mat carrier 12 is automatically prepared beneath the press as a result of the transfer cycle.

The plant of the invention is particularly suitable for manufacturing boards from mat sections of low strength/cohesion, because these mat sections are ideally guided during their transport to the press and accordingly only subjected to minimal mechanical loadings. The plant is particularly suitable for the manufacture of OSB-board and waferboard.

We claim:

1. A plant for the manufacture of particle board comprising:

a stationary scattering station for forming a mat of particulate material;

an endless forming band onto which said mat-forming material is scattered, said forming band being mounted on stationary supporting means;

means for continuously moving said forming band beneath said scattering station at a constant speed;

a movable mat cutting saw disposed above said mat for dividing said mat into individual mat sections;

a plurality of mat carriers each having first and second sides and a head strip;

an intermediate endless conveyor disposed after said forming band for moving said mat carriers beneath mat sections supplied from said forming band, whereby each mat section is transferred onto a respective mat carrier;

a vertically and horizontally moveable transfer table disposed between said scattering station and said intermediate conveyor, said transfer table having an end which overlaps said intermediate conveyor and said endless forming band, moving from said scattering station over said transfer table and being deflected around said end of said transfer table;

means for advancing and retracting said transfer table relative to said intermediate conveyor to vary said overlap, whereby said transfer table is in an advanced position at the start of transfer of a mat section from the forming band to a respective one of said mat carriers and in a retracted position at the completion of said transfer;

a cyclically operating press disposed after said intermediate conveyor and having an inlet and an outlet;

loading and unloading means for said press, with said forming band, said intermediate conveyor and said loading and unloading means corresponding to move said mat section in a transport plane;

means for separating pressed mat sections from said mat carriers at said outlet of said press;

means disposed beneath said transport plane for returning mat carriers separated from said pressed mat sections to said intermediate conveyor; wherein said intermediate conveyor simultaneously serves to supply said mat carriers to said loading means and has transport means for engaging said head strips at said first and second sides; wherein said loading and unloading means means includes further transport means for engaging said head strips at said first and second sides; wherein said further transport means move during part of their movement in said transport plane parallel to and alongside the first said transport means; wherein said means for returning mat carriers separated from said pressed mat sections includes a transfer station disposed between said loading and unloading means and said intermediate conveyor; and wherein said intermediate conveyor is constructed as an accelerating conveyor, there being means for driving said intermediate conveyor at said constant speed of said forming band during transfer of a said mat section onto a said mat carrier and for accelerating said intermediate conveyor when the said mat section is fully transferred to said mat carrier.

2. A plant in accordance with claim 1 wherein each said mat section has a respective rear edge and wherein means is provided for controlling the time at which the acceleration of said intermediate conveyor starts and the renewed advance of the transfer table in dependence on the arrival of said rear edge of each said mat section at said edge of said transfer table.

3. A plant in accordance with claim 1, wherein a waiting table inclined relative to a horizontal plane is provided in said transfer station for said mat carriers, the inclined position of said waiting table being selected so that said engagement devices of said transport means associated with the loading and unloading means for the press move out of engagement with said head strips of said mat carriers, and so that said engagement devices of said transport means of said intermediate conveyor enter into engagement with said head strips of said mat carriers.

4. A plant in accordance with claim 1, wherein said transport devices means for said intermediate conveyor and for said loading and unloading means for said press comprise chain conveyors equipped with engagement means for engagement with said head strips of said mat carriers.

5. A plant in accordance with claim 1, wherein the driving means for the movement of said transfer table on the one hand and the driving means for said forming band and said intermediate conveyor on the other hand are not synchronised with one another.

6. A plant in accordance with claim 1, wherein said mat cutting saw is constructed as a single cut saw.

7. A plant in accordance with claim 1, wherein said end of said transfer table is provided with a knife-like edge functioning as a turn around point for said forming band.

8. A plant in accordance with claim 1, wherein the end position of said transfer table after completion of its movement towards said press is adjustable in dependence on the position of said mat carrier located in the pick-up position and on the length of the actual mat section.

9. A plant in accordance with claim 8, wherein a prevailing press-side end position of said transfer table is controlled by an end switch arranged on said transfer table and actuated by said head strips of said mat carriers.

10. A plant in accordance with claim 9, wherein the position of said end switch is steplessly variable.

11. A plant in accordance with claim 1, wherein the start of said intermediate conveyor and the return movement of said transfer table is controlled in dependence on the arrival of said mat section at the knife edge of said transfer table.

12. A plant in accordance with claim 7, wherein a chassis is provided for movement of said transfer table and is pivotally supported by said forming band guide that said knife-like edge of said transfer table lies at least substantially on the respectively present mat carrier, whereby said head strips of said respective mat carriers lift and lower said transfer table as they overtake said table.

13. A plant in accordance with claim 1, wherein the speed of movement of said transfer table is larger than the maximum speed of said forming band and smaller than the maximum speed of said intermediate conveyor.

14. A plant in accordance with claim 1, wherein said forming band is provided with a movable roller displaceably journaled in accordance with the movement of said transfer table as said band passes over said roller and said end of said transfer table, whereby to maintain tension on said band during movement of said transfer table and said forming band.

15. A plant for the manufacture of particle board comprising:

an endless moveable forming band conveyor on which a mat of particulate material is deposited;

means for cutting said deposited mat into segments;

an intermediate endless belt conveyor in proximity to said mat-forming conveyor to receive cut mats for subsequent pressing;

a vertically and horizontally moveable transfer table about which said forming band extends at an unloading end thereof, said transfer table being reciprocable in the direction of movement of said forming band and provided with a forward end extendable over said intermediate endless belt conveyor in overlapping relationship;

means for transferring said cut mat segments from said forming band and said transfer table to said intermediate conveyor when said transfer table overlaps said intermediate conveyor; and means for driving said forming band and intermediate conveyor at speeds independent from one another.

* * * * *